US008364328B2

(12) United States Patent
Hedrick

(10) Patent No.: US 8,364,328 B2
(45) Date of Patent: Jan. 29, 2013

(54) AVIONICS DATA ENTRY DEVICES

(76) Inventor: Geoffrey S. M. Hedrick, Malvern, PA (US)

( * ) Notice: Subject to any disclaimer, the term of this patent is extended or adjusted under 35 U.S.C. 154(b) by 0 days.

(21) Appl. No.: 13/087,098

(22) Filed: Apr. 14, 2011

(65) Prior Publication Data

US 2012/0265372 A1    Oct. 18, 2012

(51) Int. Cl.
*G05D 1/00* (2006.01)
*G09G 5/00* (2006.01)
(52) U.S. Cl. ................. 701/3; 701/14; 345/169
(58) Field of Classification Search .............. 701/1, 3, 701/14, 484, 491, 492; 340/945; 345/169
See application file for complete search history.

(56) References Cited

U.S. PATENT DOCUMENTS

| | | | | |
|---|---|---|---|---|
| 5,758,297 A * | 5/1998 | Gaultier | ................. | 701/14 |
| 6,401,013 B1 * | 6/2002 | McElreath | ................. | 701/3 |
| 6,633,801 B1 * | 10/2003 | Durlacher et al. | ................. | 701/9 |
| 7,421,319 B2 * | 9/2008 | Stefani | ................. | 701/3 |
| 7,755,890 B2 | 7/2010 | Rui et al. | | |
| 7,769,501 B2 * | 8/2010 | Lusardi et al. | ................. | 701/3 |
| 2006/0041340 A1 * | 2/2006 | Stefani | ................. | 701/4 |
| 2007/0016344 A1 * | 1/2007 | Stefani | ................. | 701/3 |
| 2007/0027616 A1 | 2/2007 | Masson | | |
| 2007/0264953 A1 | 11/2007 | Srinivasan et al. | | |
| 2008/0140266 A1 * | 6/2008 | Stefani | ................. | 701/3 |
| 2008/0228330 A1 * | 9/2008 | Srinivasan et al. | ................. | 701/3 |
| 2010/0105329 A1 | 4/2010 | Durand et al. | | |
| 2011/0313645 A1 * | 12/2011 | Shukla | ................. | 701/120 |

OTHER PUBLICATIONS

EFIS App for iPad manual, Laminar Research, [retrieved on May 10, 2011]. Retrieved from the X-Plane Wiki Internet site <URL: http://wiki.x-plane.com/Category:EFIS_App_for_iPad_manual>.
European Communication, including Partial European Search Report for EP 12159114.3, dated Oct. 10, 2012.

* cited by examiner

*Primary Examiner* — Khoi Tran
*Assistant Examiner* — Jason Holloway
(74) *Attorney, Agent, or Firm* — Bryan Cave LLP

(57) ABSTRACT

Methods, systems, and apparatuses for the use of a wireless portable avionics device in conjunction with on-board flight systems and/or off-board service providers. The device may be used by aircraft personnel such as pilots and may act as a command/data entry and/or display tool to augment cockpit display systems. The device can receive flight data (e.g., a flight plan) from an off-board provider and automatically transfer it, as well as any previously prepared commands or data, to a flight management system and/or cockpit display systems. Commands and/or data (including pre-existing ones and ones entered in real-time) can be wirelessly transferred to the on-board flight systems which are not in direct physical contact with the device. Thus, the device can be easily manipulated during turbulence or under poor readability conditions. The device can be used to manipulate items shown on cockpit display systems in a timely and accurate manner.

18 Claims, 5 Drawing Sheets

AVIONICS DATA ENTRY DEVICES

FIELD OF THE INVENTION

The invention is directed to flight control and display systems, and more particularly to avionics data entry devices, systems and methods of using the same.

BACKGROUND OF THE INVENTION

Data entry is often challenging in modern aircraft cockpit systems. Data entry in such systems is typically enabled through a combination of keyboards, trackballs and/or joysticks which are fixed or physically connected to on-board flight systems. Alternatively or in addition, touch screen displays, such as digital flat panel displays (FPDs) having touch-sensitive pads which are part of and integral to the on-board flight system, can also be used for data entry purposes using one's fingers or a stylus. Certain conditions, however, can significantly impede a pilot or other flight crew member's ability to enter data using these existing data entry tools.

For example, under turbulence conditions, a pilot may not be able to accurately manipulate a cursor or touch screen display, or enter keyboard commands using data entry tools that are physically connected to, or are a part of, on-board cockpit equipment. As another example, under poor readability conditions in the, cockpit—e.g., situations where the aircraft orientation is such that sunlight affects the readability of figure print marks on the flight display system—a pilot may not be able to clearly discern information displayed on displays that are physically connected to, or are a part of, on-board cockpit equipment, let alone react to by entering certain commands using the same data entry tools. This problem is especially apparent in multipurpose FPDs which are heavily-populated and, as a result, increase the difficulty for the pilot to observe the relevant onscreen data in sufficient time to promptly take appropriate action because of a failure to properly view the relevant onscreen data and/or accurately enter the appropriate command or manipulate the correct parameters.

In critical times, where information needs to be promptly ascertained from flight display systems and when commands or adjustments need to be promptly entered during different flight phases, any difficulty in enabling the pilot to accurately and promptly read and/or enter data can, unfortunately, result in serious consequences.

Therefore, there is a need for a data entry/display tool that is easy to manipulate in a timely and accurate manner during turbulence and/or can be used as an alternative to, and/or to augment, flight display systems under poor readability conditions.

In addition, there is also a need for such a data entry/display tool to enable the automated transfer of previously prepared commands, or data—such as flight plans which would otherwise have to be manually entered—to on-board flight systems.

SUMMARY OF PARTICULAR EMBODIMENTS OF THE INVENTION

In various embodiments, the invention provides methods, systems and apparatuses for the use of an avionics device in conjunction with on-board flight systems and/or off-board service providers. The avionics device, which preferably is a portable handheld device with wireless and data entry capabilities, may be used by aircraft personnel such as pilots and may act as a command/data entry and/or display tool to augment cockpit display systems.

A wireless link can be established between the avionics device and the on-board flight systems so as to interface with various aircraft systems. One or more mobile software applications running on the avionics device can be used to transfer commands and/or data (including flight-related information such as a flight plan or components thereof) to the flight systems, and/or to synchronize the display between the avionics device and cockpit display systems. When used on board the aircraft, the avionics device is preferably not in direct physical contact with any flight systems and can therefore be easily manipulated under regular or sub-optimal conditions such as during turbulence or poor readability conditions. The various data entry components on the device can be used to enter commands, flight-related or other information, and/or manipulate items shown on cockpit display systems (e.g., via touch screen control) in a timely and accurate manner.

A wireless link can be established between the avionics device and a ground control system or Internet flight planning service. A mobile software application running on the avionics device can be used to receive flight data (e.g., a flight plan) from the flight planning service and enter or automatically transfer it, as well as any previously prepared commands or data, to the cockpit flight management system and/or cockpit display systems.

Other benefits and features of the present invention may become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

Further features of the invention, its nature and various advantages will be more apparent from the following detailed description of the embodiments, taken in conjunction with the accompanying drawings in which.

DETAILED DESCRIPTION OF EMBODIMENTS OF THE INVENTION

Figure 1:
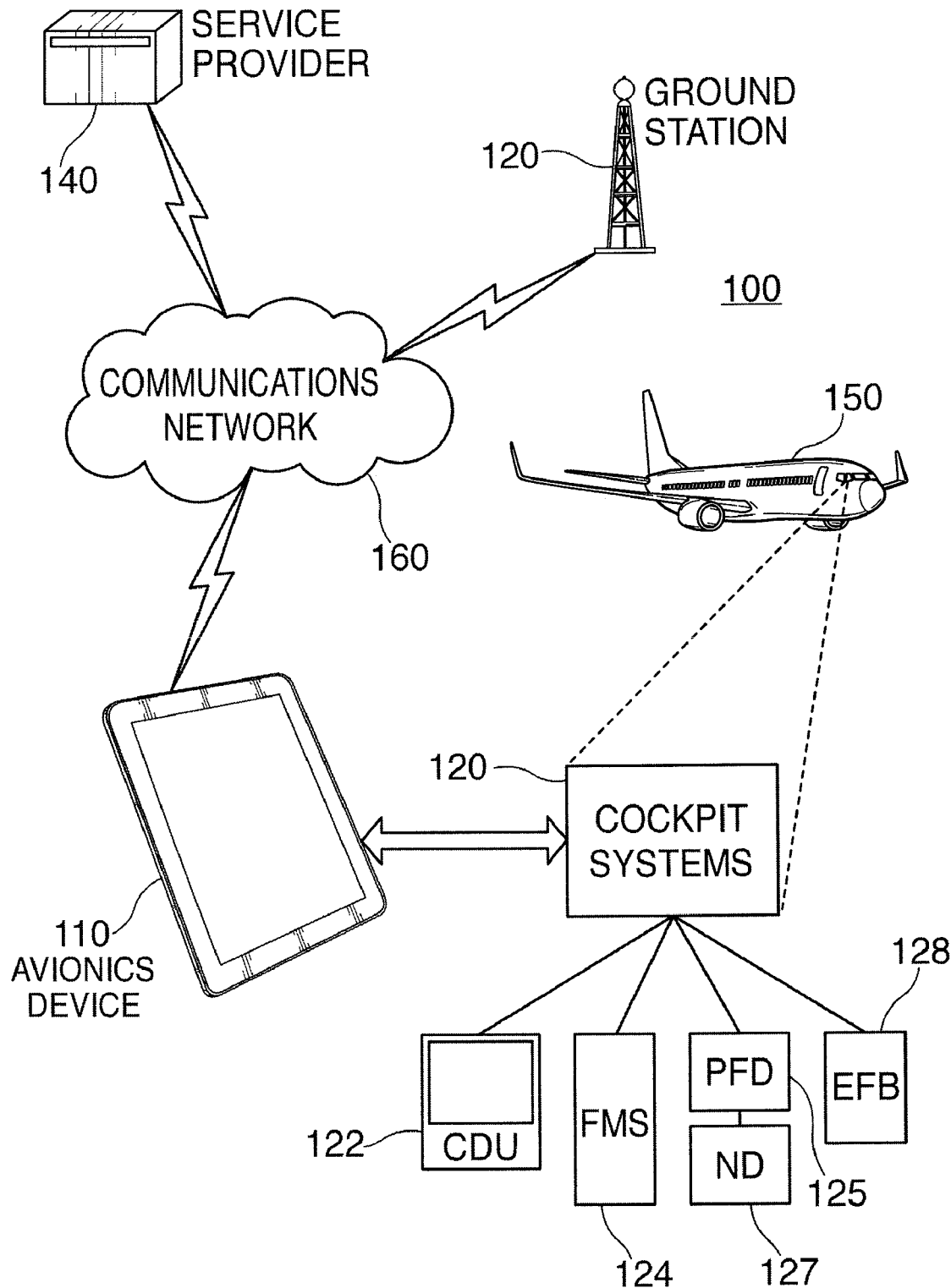
FIG. 1 is a block diagram illustrating the interaction between the avionics device, cockpit systems and off-board information sources in accordance with certain embodiments.
Figure 2A:
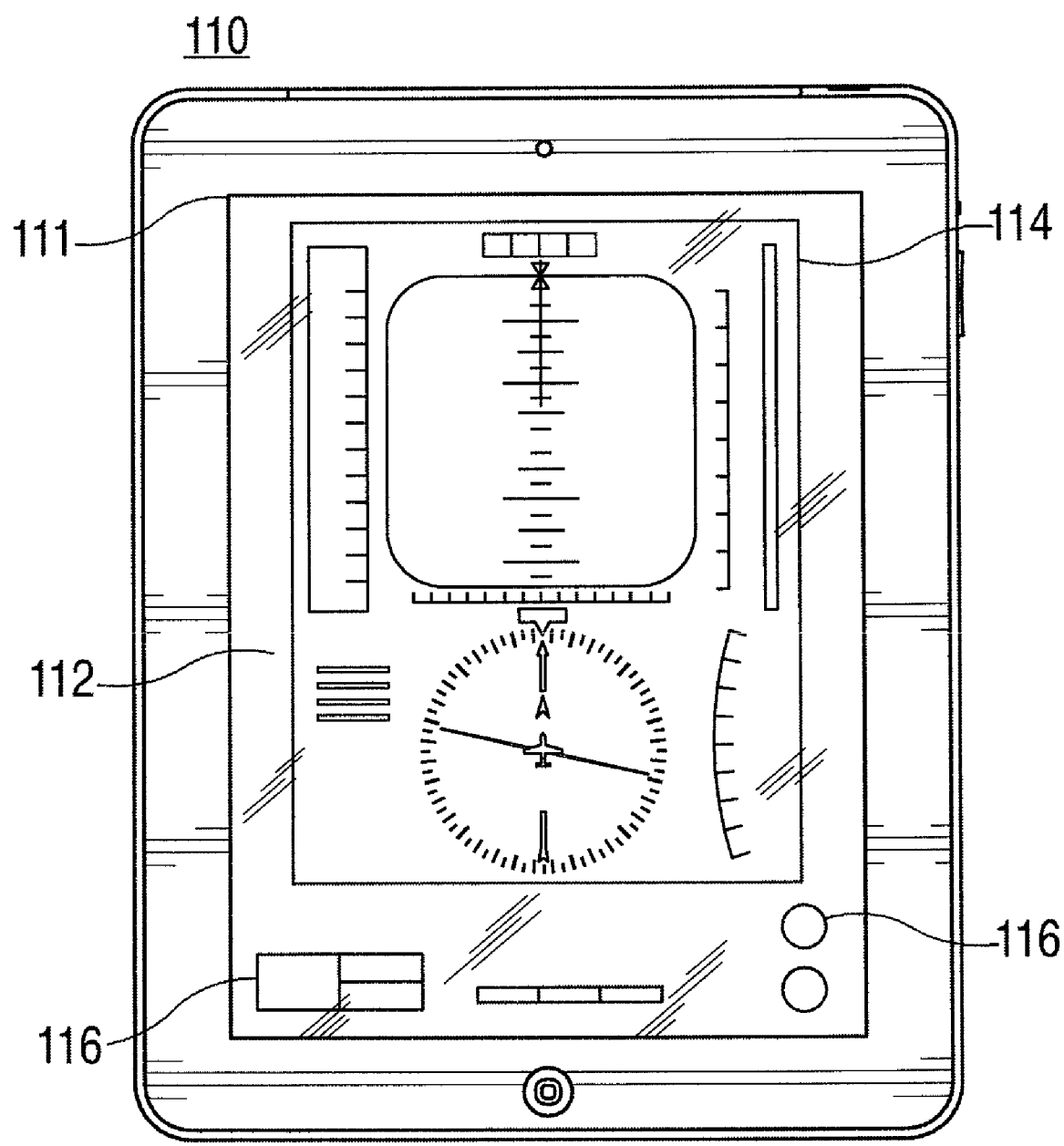
FIG. 2 shows exemplary embodiments of the avionics device of FIG. 1 in accordance with certain embodiments.
Figure 2B:
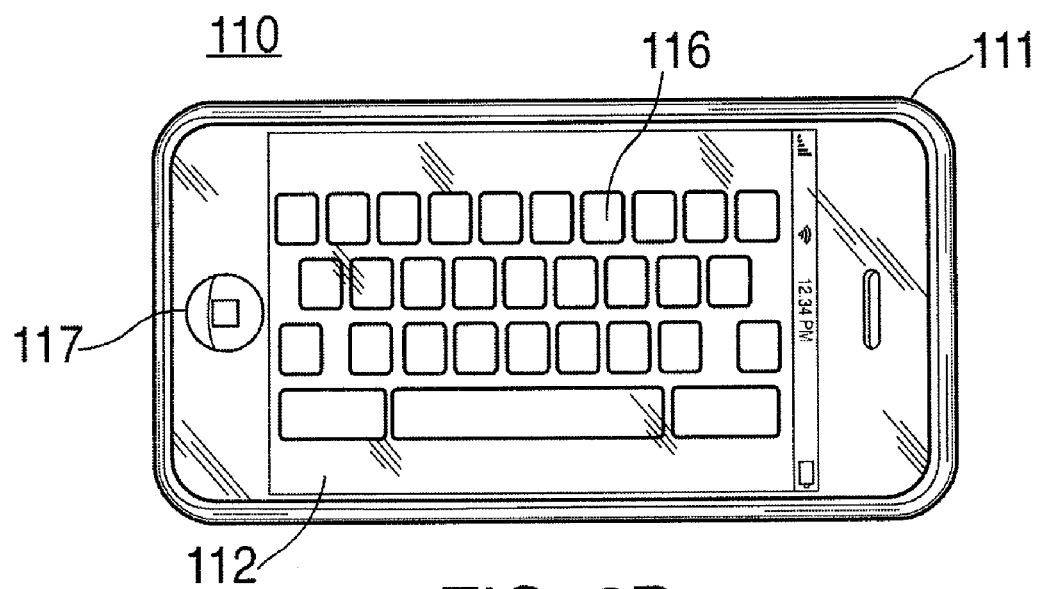
Figure 2C:
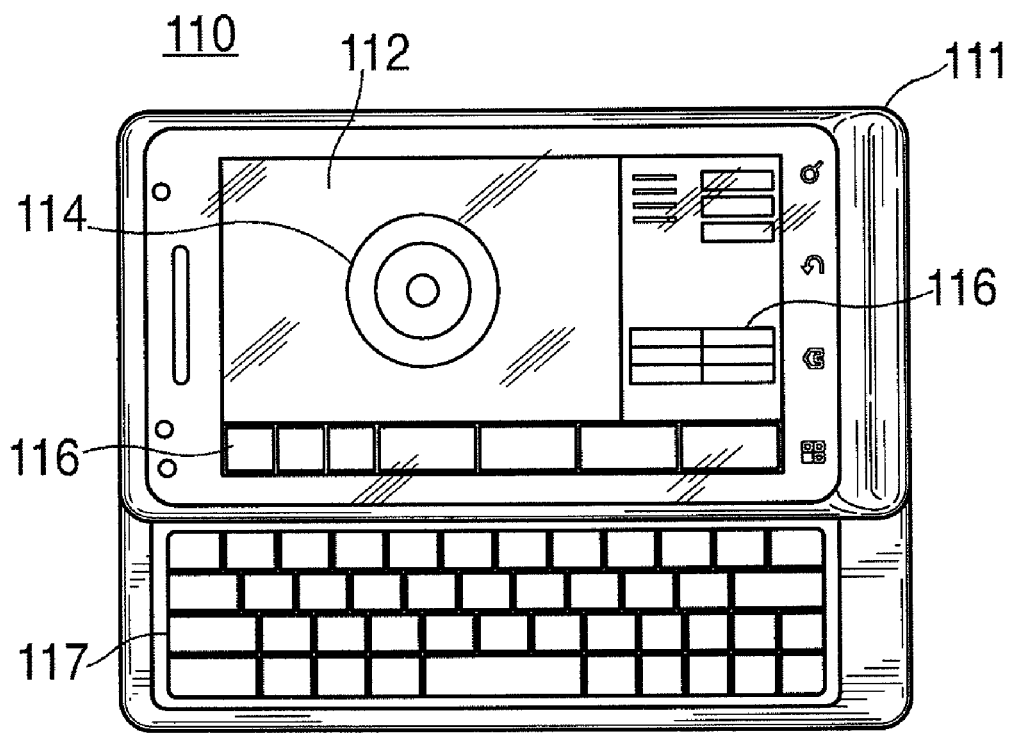

Further details are described below in relation to FIGS. 1-4, whereby FIG. 1 depicts an avionics system 100 for use in conjunction with aircraft cockpit systems and off-board providers according to certain embodiments of the invention. FIGS. 2A-C illustrate different examples of embodiments of the avionics device 110. Those skilled in the art will recognize, based on this disclosure and an understanding therefrom of the teachings of the invention hereof, that the particular hardware and devices that are part of system 100 or avionics device 110, and the general display functionality provided by and incorporated therein, may vary in different embodiments of the invention. Accordingly, the particular system components shown in FIGS. 1 and 2 are for illustrative purposes to facilitate a full and complete understanding and appreciation of the various aspects and functionality of particular embodiments of the invention as realized in method and apparatus embodiments thereof.

Figure 3:
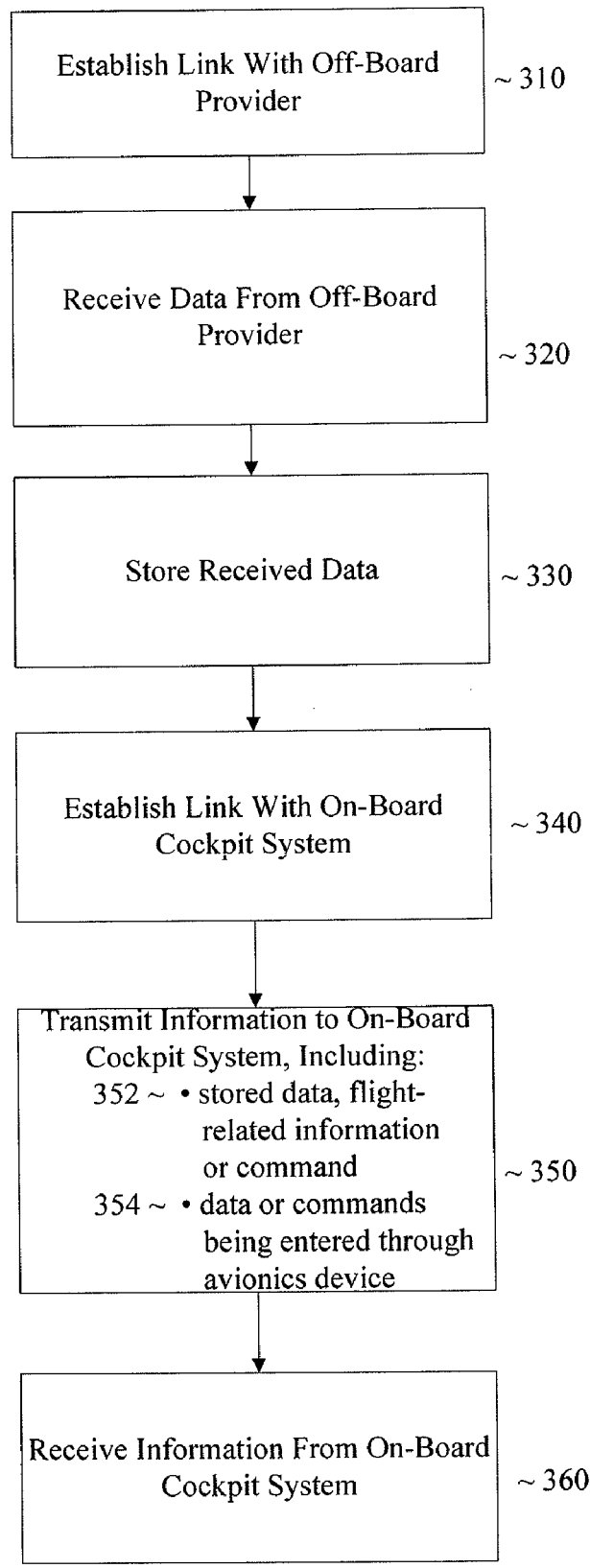
FIG. 3 is a flow chart of an exemplary process that can be implemented by the avionics device of FIGS. 1 and 2 in accordance with certain embodiments.
Figure 4:
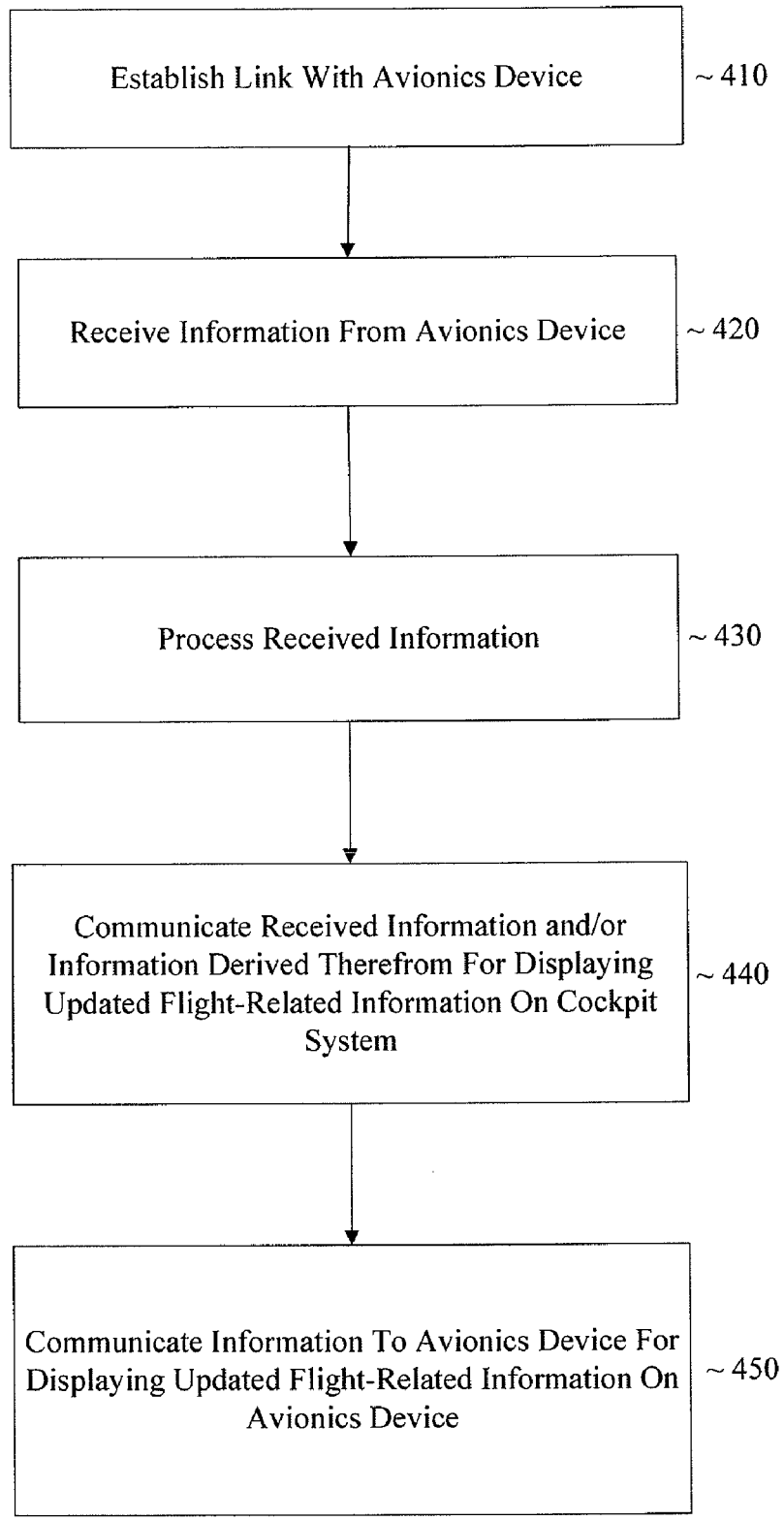
FIG. 4 is a flow chart of an exemplary process that can be implemented by cockpit systems that interact with the avionics device of FIGS. 1 and 2 in accordance with certain embodiments.

The flow chart of FIG. 3 is an example of a process that can be implemented by avionics device 110 of FIGS. 1 and 2, whereas the flow chart of FIG. 4 is an example of a process that can be implemented by one or more of on-board aircraft or cockpit systems 120 of FIG. 1 that interact with avionics device 110. It is contemplated and intended that certain embodiments of the invention are implemented by way of software programming to provide particular advantageous functionality and, moreover, such programming can take various forms within the inventive scope. Although the following description, including the description of FIGS. 1-4, includes particular references to certain exemplary embodiments, the invention is not limited to such embodiments. It will be apparent to those of skill in the art that various features, variations, and modifications can be included or excluded from the embodiments described below.

FIG. 1 illustrates the interaction between the various parts that form system 100, including avionics device 110, cockpit systems 120 and off-board information sources 130 and/140. When used on board aircraft 150, device 110 is preferably in wireless communication with flight systems (preferably conventional flight systems in the aircraft cockpit) so as to enter data or commands, and/or automatically transfer information, into cockpit systems 120, such as Flight Management System (FMS) 124. As such, when used on board the aircraft by crew members such as a pilot, co-pilot or other suitable personnel, device 110 is part of an on-board flight system and serves to augment cockpit systems 120. By not being physically connected or fixed—e.g., in direct physical contact with or a part of on-board equipment—to the aircraft, the hand held device 110 is easy to manipulate during turbulence and/or can be used as an alternative to flight display systems, such as Primary Flight Display (PFD) 125, Navigation Display (ND) 127—or Multi-Function Display (MFD)—or any displays that are part of an Electronic Flight Instrument System (EFIS), for example, when poor readability conditions in the cockpit exist. Device 110 can also be used as an additional display, for example, to present information that is either duplicative of or not currently shown on any EFIS displays. Avionics device 110 can also, or alternatively, be used in conjunction with other cockpit systems such as Electronic Flight Bag (EFB) 128. Avionics device 110 may be used in the aircraft pre or post flight, during all flight phases or during all but critical flight phases. For example, if device 110 is considered loose equipment, it may be turned off (or at least its wireless communications capabilities/interface may be disabled) and stowed during take-off and/or landing.

When used on board or off board the aircraft by any operator (including crew members such as a pilot, co-pilot or other user), device 110 can be used to receive flight-related information from a ground control ground system or ground station 130 such as a control tower, and/or from a service provider 140 such as a flight planning service provider. For example, a mobile software application running on device 110 can be used to obtain or compute a flight plan with the assistance of an internet flight planning service such as DUAT. Such a mobile application may be a standard browser that is capable of accessing the internet, may be specifically tailored to flight planning activities (such as a DUAT Mobile application), or may be part of a more comprehensive flight-control mobile application such as an EFIS app for iPad, which is discussed below.

The obtained flight data, or any previously prepared commands or data, can be transferred to on-board systems such as a particular aircraft's cockpit system 120 by a user who operates device 110 on board the aircraft. Such a transfer may occur automatically (e.g., upon the establishment of a wireless data link between device 110 and the individual cockpit system 120, or upon a single action taken by the user on the device 110 to initiate or confirm the transfer). Device 110 may be configured to run a mobile software application that allows for the transfer of flight data or commands to on-board aircraft systems. The mobile application discussed herein in conjunction with transferring information may be the same or different/separate mobile application than the one discussed above in conjunction with obtaining flight-related information from an off-board provider. Therefore, instead of having to manually enter a flight plan or components thereof into FMS 124 or a GPS system, device 110 can be used to automatically transfer the flight plan to the aircraft systems, whether or not the flight plan was obtained or computed through a flight planning service.

Avionics device 110 may be any portable device having wireless communications capabilities. In certain embodiments, device 110 may be a tablet, computer, laptop, smart phone, PDA or other handheld device. Device 110 may be a personal tablet or smart phone device belonging to or used by a crew member to access media and/or the internet and that communicates with other devices or networks through RF technology (such as an iPad, iPhone, iPod Touch or the like—see e.g., FIG. 2). Device 110 may be a standard commercial-off-the shelf (COTS) portable device or a modified COTS. Alternatively, device 110 may be a dedicated device that is specially-tailored, or purpose-built, to perform any or all the functions described herein.

As can be seen from FIGS. 2A, 2B and 2C. Avionics device 110 preferably includes transceiver 111, display 112, data entry components 116 or 117, or any combination of the same. Device 110 may include other standard, or specially-designed components such as one or more processors and physical memory (not shown). The device memory may store computer-readable media that include instructions adapted to cause the processor, and hence device 110, to perform several functions described herein, including certain steps discussed in conjunction with FIG. 3 and process 300. The computer-readable media on device 110 may include instructions issued by any of the mobile software applications discussed herein.

Transceiver 111 may include one or more antennas which may be aligned along one side of device 110 (e.g., FIG. 2C), may be the steel frame of device 110 (e.g., FIG. 2B), may be the LCD frame of display 112 (e.g., FIG. 2A), or may be embedded in any other suitable location within the device 110. Transceiver 111 may handle RF communication between device 110 and on-board or off-board systems/networks. In addition or alternatively, other antennas and/or chipsets may be included in device 110 to handle GPS communication and mobile network (i.e., cell) reception/transmission.

For example, transceiver 111 of device 110 may be used to establish a wireless data link with an off-board provider for receiving flight-related information from the provider, as shown in step. 310 of FIG. 3. As can be seen in FIG. 1, transceiver 111 may enable device 110 to communicate wirelessly through communications network 160 with the provider so as to establish a wireless data link in the form of a radio connection that enables device 110 to receive information or data from the provider, such as flight-related information, as shown in step 320 of FIG. 3. The off-board provider may be any source of information that is located off board such as the examples shown in FIG. 1, including a remote service provider 140 (such as a flight planning service provider) or a ground station 130 (such as a control tower). The flight-related data that may be received through communications network 160 from the off-board provider may be a flight plan, or any components thereof, which are preferably stored on the memory in device 110, as shown in step 330 of FIG. 3. Other flight-related data or information that may be received at step 330 and may include aircraft operating manual(s), flight crew operating manual(s), navigational chart(s), or any information that may pertain to a pilot or crew member's upcoming flight or that may be stored in a conventional Electronic Flight Bag.

The flight-related data that may be received through communications network 160 of FIG. 1 may be received while device 110 is used on-board aircraft 150, prior to and close in time to the upcoming relevant flight, or at any time while device 110 is not physically on-board aircraft 150. Communications network 160 may include the internet or may be a mobile network, local-area network, a direct temporary two way or one-way channel, any other wireless or partly-wired network, or any wireless connection. As such, the wireless link established with the off-board provider may be a cellular network link or a Wi-Fi network link. Alternatively, device 110 may be physically connected to any other device that communicates with the service provider through network 160 or a dedicated connection.

Transceiver 111 of device 110 may also be used to establish a wireless data link, as shown in step 340 of FIG. 3 and step 410 of FIG. 4, with one or more on-board flight systems, which are preferably also equipped with one or more transceivers. Device 110 may thus interface and communicate with conventional flight systems which are equipped with or coupled to a wireless data interface using standard communication protocols. For example, FMS 124, EFB 128 and/or any of the displays shown in FIG. 1, such as PFD 125 and/or ND 127—and/or any other displays that are part of an EFIS such as an EID or MFD—may include or be coupled to a wireless data interface so as to be Wi-Fi or Bluetooth enabled. Accordingly, the data link between device 110 and cockpit systems 120 may be a short-length radio wave connection, such as a Wi-Fi connection or one that complies with Bluetooth standards. One purpose for establishing such a wireless connection may be to transfer the flight-related data that is received from the provider and stored on the device memory, as shown in step 350 of FIG. 3 and, more generically, in step 420 of FIG. 4. Specific examples of pre-existing or previously prepared information that may be transmitted to a particular cockpit system are listed under 352 of FIG. 3. For example, after a data link is established with certain cockpit systems (such as FMS 124 of FIG. 1), the flight plan that was previously stored may be transmitted to FMS 124 as shown. Alternatively, any other kind of data loading can be done (such as airborne software, databases, etc.). For example, flight-related data that is received from the provider in the form of flight plan components may be transmitted to FMS 124 through the established wireless data link. Such components may include any information relevant to a navigation database (NDB) which is typically found in an FMS and which is used to build a flight plan. For example, NDB components may include waypoints, airways, radio navigation aids, airports, runways, standard instrument departure, standard terminal arrival, holding patterns, etc. Such components or other data to be loaded may not have been received from a provider or otherwise stored by the user on device 110, but may instead be known to the device user (e.g., based on previous flights or based on direct communications between the pilot and a control tower or other ground station that does not involve avionics device 110 but is perhaps done through existing aircraft equipment). In those situations, the user may use data entry components 116/117 of FIG. 2 to enter the pertinent data into FMS 124 of FIG. 1 through the established connection with cockpit systems 120.

Thus, another purpose for establishing the wireless data link with on-board flight systems is to enter information in the form of real-time data or commands to cockpit systems 120, as shown under 354 of FIG. 3 and, more generically, in step 420 of FIG. 4, and as discussed herein in connection with flight plan components, in connection with controlling or interacting with EFIS components shown in FIG. 1, such as PFD 125 and/or ND 127, or in relation to interacting with EFB 128. For example, device 110 may be used to select approach plate(s) that may be displayed on ND 127 or to control any application that would otherwise run on EFB 128. In certain embodiments, a Cyclic Redundancy Check (CRC) or other check value may be appended to or wrapped around the wirelessly transmitted data (e.g., the real-time information or previously available flight-relate data) in order to ensure integrity (thus the mobile application running on the device, as well as the on-board flight equipment with which the device directly communicates may include appropriate data encoder/decoder designed to catch transmission errors). Device 110 is preferably qualified to meet the safety criticality requirement of its functions by adhering to certification standards, and/or does not cause interference with other aircraft systems.

Device 110 may be used in part to perform a subset or all of any operations that CDU 122 might otherwise perform. To this end, device 110 may be configured to run a mobile software application that allows it to mimic a CDU, or other fixed-position keypads, keyboards or cursor control devices, by displaying buttons and or a display that would otherwise be available on CDU 122 (e.g., a CDU app for iPad). Alternatively, device 110 may be configured to run a mobile software application that allows it to mimic an EFIS by displaying triggers, instruments, icons or other items that would be shown on PFD 125, ND 127 (or MFD) and/or an Engine Instrument Display (EID)—e.g., an EFIS app, a PFD-only app, an ND-only app, a combined PFD/ND app, an EID app, an MFD app for iPad. Device 110 may be configured to run a mobile software application that allows it to perform functions of EFB 128 (e.g., a EFB app for iPad). Some of these applications may include static applications (such as document viewing), electronic checklists, manuals, flight performance calculations, electronic approach charts (whether interactive or not), weather-related information display, head-down display or video cameras, etc. The mobile application discussed herein in conjunction with entering information or commands may be the same or different/separate mobile application than the ones discussed above in conjunction with obtaining flight-related information from an off-board provider and/or transferring information to on-board aircraft systems.

As stated above with respect to FIGS. 2A-2C, device 110 preferably includes display 112 and/or, data entry components 116 or 117. A typical display may be touch-sensitive and can be used to manipulate items and information displayed on the screen (as shown by items 116 in FIGS. 2A-2C) through the user's finger(s) or using a stylus. For example, device 110 may be configured to run a mobile application that allows it to be used as a cursor control device while a wireless data link is established with the cockpit systems (such as the FMS, PFD, ND and/or EFB shown in FIG. 1), whereby data entry components 116 and/or 117 (e.g., buttons, touch screen or keyboard) are adapted for actuation by the user so as to manipulate a cursor that is displayed on the cockpit display system substantially in real-time. Thus, data entry components may include touch screen display 112 which is adapted to be used to manipulate the cursor. Data entry components may also include a keyboard (either one that is an image-simulated keypad as in FIG. 2B or that is physical as in FIG. 2C) that is adapted to be used to enter the commands that are transferred to cockpit systems 120 of FIG. 1 when the user is on board and controlling aircraft 150, or ones sent through communications network 160 to request and receive flight-related information (when the user is either on board or off board the aircraft).

Displayed keys and items 116 as well as physical keys 117 can be used for entering data, modifying flight parameters (e.g., on primary flight display 112 of FIG. 2A), making selections, manipulating maps or charts—through zooming in or out, panning, scrolling or moving to another location (e.g., navigation display 112 of FIG. 2C). To this end, the mobile application running on device 110 may allow device 110 to be used as an entry and manipulation tool that is confirmed by the relevant display (e.g., whereby manipulation of a map on device 110 is synchronized with—so as to be mimicked by corresponding changes in—what is displayed on ND 127 or EFB 128 in real-time). Thus, in real-time, device 110 may be used for any data/command entry that relies on any of the aforementioned data components (e.g., keyboard, control panel, touchpad). To this end, any one of the cockpit systems 120 (e.g., FMS 124, PFD 125, ND 127 and/or EFB 128) has a processor and physical memory (not shown), whereby the memory may store computer-readable media that include instructions adapted to cause the processor, and hence the relevant cockpit system 120, to perform several functions described herein, including certain ones discussed in conjunction with FIG. 4 and process 400. For example, once the link (which is preferably a wireless data link as discussed above) between any one of cockpit systems 120 and device 110 is established at step 410, information can be received from device 110 at step 420, processed at step 430 (e.g., by constructing a flight plan from received components or computing changes to any flight-related information) and communicated to the appropriate cockpit display at step 440 so as to display updated flight-related information.

As can be seen from FIGS. 3 and 4, there is some overlap between certain steps in each of the processes in those figures given that process 300 of FIG. 3 is performed by circuitry in avionics device 110 and process 400 of FIG. 4 is performed by circuitry in the in cockpit systems 120 in communication with device 110. For example, steps 340 and 410 are related given that they describe establishing a link from the perspective of avionics device 110 and one or more of cockpit system, respectively. As another example, steps 350 and 420 are related given that they describe transmitting and receiving information from the perspective of avionics device 110 and one or more of cockpit systems 120, respectively. Similarly, each one of the processes in FIGS. 3 and 4 may include an additional step to ensure that the displays in avionics device 110 and one or more of cockpit systems 120 are synchronized. More specifically, step 360 if FIG. 3 and step 450 of FIG. 4 specify that information is transmitted from the cockpit system and received by the avionics device. Such information may be information resulting from the processing at step 440 (e.g., changes or updates to flight-related information), updated flight-related information, unprocessed information, etc. or may be initialization information. This way, the crew member (e.g., pilot of co-pilot) can enter data or commands through avionics device 110, and he/she or another crew member can confirm that these commands have been entered by looking at display on cockpit systems 120 or avionics device 110 itself. Similarly, the crew member can enter data or commands directly into any on-board cockpit systems, and any relevant changes to any display can be confirmed by looking at the avionics device display.

Items that can be presented on display 112 and manipulated by components 116/117 (including the display itself in case it is touch sensitive) include flight-related data, such as primary data required for constant viewing and use by a pilot to maintain control of the aircraft and/or secondary data relating to, for example, fuel loads, electrical system status, hydraulic pressures and en route leg and estimated destination times. Other examples include information shown and manipulated on a Primary Flight Display, such as flight parameters including orientation, speed, altitude and heading, a Navigation Display, such as navigation-related information, and/or an Engine Instrument Display, such as N1, N2 and/or N3% RPM, EPR, oil temperature, pressure and quantity. Portions of any such displays may be manipulated by making selections of displayed items, magnifying what is displayed, etc. Yet other examples include information shown and manipulated on an Electronic Flight Bag, such as aviation data, flight performance calculations, navigational charts, etc. Some or all manipulation of information displayed on device 110 may be synchronized with (Or reproduced on) what is displayed on the relevant cockpit display system, and vice versa.

Referring back to FIG. 1, when avionics device 110 is used on-board an aircraft 150, device 110 need not be in direct physical contact with any flight systems in the aircraft. Instead, device 110 can be manipulated by the user holding the device in his/her hand(s). This way, under turbulence conditions, a pilot or other user may accurately manipulate any of the data entry components of FIG. 2 (e.g., buttons, touch screen or keyboard) to enter data and/or commands that control certain cockpit systems 120 of FIG. 1, without being influenced by the same amount or magnitude of shaking affecting the cockpit systems. Alternatively or in addition, under poor readability conditions in the cockpit—e.g., situations where the aircraft orientation is such that sunlight affects the readability of figure print marks on displays 125 and/or 127—a pilot or other user may easily orient device 110 so as to move its display or the pilot's head out of the sunlight in order to clearly discern information displayed on the avionics device display.

While there have shown and described and pointed out various novel features of the invention as applied to particular embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in another disclosed or described or suggested form or embodiment, which in some cases may be as a general matter of design choice. It is the intention, therefore, to be limited only as indicated by the scope of the claims appended hereto.

What is claimed is:

1. An avionics system having an augmented cockpit display system through a portable handheld device that is not physically connected to any cockpit systems in an aircraft, the portable handheld device comprising:
    data entry components configured for actuation by a user on board the aircraft to enter commands that control the cockpit display system, and
    a transceiver that establishes: 1) a first wireless data link with an off-board provider located remotely configured to receive flight-related information; and 2) a second wireless data link with one or more on-board flight systems configured for wirelessly: a) transferring the flight-related information to the one or more on-board flight systems; and b) transferring the commands entered by the user to the cockpit display system;
    wherein the portable handheld device is configured to be used as a control device while the second wireless data link is established, wherein the data entry components are configured for actuation by the user so as to manipulate information presented on the cockpit display system in a manner that synchronizes what is displayed on the cockpit display system with what is displayed on the portable handheld device.

2. The avionics system of claim 1 wherein the first wireless data link is a radio connection that enables the portable handheld device to communicate with the off-board provider through the interne or other network connection.

3. The avionics system of claim 1 wherein the second wireless data link is a short-length radio wave connection.

4. The avionics system of claim 1 wherein the off-board provider is a flight planning service provider that is adapted to communicate a flight plan to the portable handheld device through the first wireless data link.

5. The avionics system of claim 1 wherein the off-board provider is a ground station that is adapted to communicate the flight-related information to the portable handheld device through the first wireless data link.

6. The avionics system of claim 1 wherein the flight-related information is a flight plan and the one or more on-board flight systems is a flight management system, wherein the portable handheld device is adapted to transfer the flight plan automatically to the flight management system upon establishment of the second wireless data link.

7. An avionics system having an augmented cockpit display system through a portable handheld device that is not physically connected to any cockpit systems in an aircraft, the portable handheld device comprising:
    data entry components that are configured for actuation by a user on board the aircraft to enter commands that control the cockpit display system, and
    a transceiver that establishes: 1) a first wireless data link with an off-board provider located remotely configured to receive flight-related information; and 2) a second wireless data link with one or more on-board flight systems configured for wirelessly: a) transferring the flight-related information to the one or more on-board flight systems; and b) transferring the commands entered by the user to the cockpit display system;
    wherein the portable handheld device is configured to be used as a cursor control device while the second wireless data link is established, whereby the data entry components are configured for actuation by the user so as to manipulate a cursor that is displayed on the cockpit display system substantially in real-time.

8. The avionics system of claim 7 wherein the data entry components include a touch screen display that is adapted to be used to manipulate the cursor.

9. The avionics system of claim 1 wherein the data entry components include a keyboard that is adapted to be used to enter the commands that are transferred to the cockpit display system through the second wireless data link.

10. The avionics system of claim 1 wherein the data entry components are adapted for actuation by the user to receive flight-related information through the first wireless data link when the user is not on board the aircraft.

11. An on-board flight system having an augmented cockpit display system that interacts with a portable handheld device that is not physically connected to any cockpit systems in an aircraft, the on-board flight system comprising:
    a transceiver that establishes a wireless data link with the portable handheld device, the transceiver being configured to: a) receive data from the portable handheld device; and b) receive commands entered by a user on board the aircraft through the portable handheld device that includes data entry components configured for actuation by a user on board the aircraft to enter commands that control the cockpit display system, the portable handheld device being configured to be used as a control device that manipulates information presented on the cockpit display system while the wireless data link is established; and
    a display coupled to the transceiver, the display being configured to: a) display flight-related information based on the data received from the portable handheld device; and b) display changes to the flight-related information based on the commands received from the portable handheld device in a manner that synchronizes what is displayed on the display with what is displayed on the portable handheld device.

12. The on-board flight system of claim 11 wherein the wireless data link is a short-length radio wave connection.

13. The on-board flight system of claim 11 wherein the received data are components of a flight plan and the displayed flight-related information is a flight plan, the on-board flight system further comprising a flight management system which is adapted to build the flight plan based on the components received from the portable handheld device.

14. The on-board flight system of claim 11 wherein the display comprises a navigation display and the received commands include selections of approach plates such that the display is adapted to display the selected approach plates.

15. A non-transitory computer readable medium on an aircraft cockpit system storing computer readable program instructions, the instructions causing the cockpit system to implement a method for processing flight-related information, the method comprising:
    establishing a wireless data link with a portable handheld device that is not physically connected to the aircraft cockpit system, wherein the portable handheld device: 1) includes data entry components that are configured for actuation by a user on board the aircraft to enter commands that control, and manipulate information presented on, a cockpit display system, and 2) is configured to be used as a control device while the wireless data link is established;
    synchronizing what is displayed on the cockpit display system with what is displayed on the portable handheld device;

receiving through the established wireless data link data from the portable handheld device, the data being provided to the portable handheld device from an off-board information source;

computing flight-related information based on the data received from the portable handheld device; and communicating the flight-related information for display on the cockpit display system.

16. The non-transitory computer readable medium of claim 15 wherein the method further comprises:

receiving through the established wireless data link at least one command entered by a user using the portable handheld device in proximity with the aircraft cockpit system;

computing changes to the flight-related information based on the at least one command received from the portable handheld device; and communicating the changes to the cockpit display system for displaying thereon updated flight-related information.

17. The non-transitory computer readable medium of claim 16 wherein the method further comprises wirelessly communicating the changes to the portable handheld device for displaying thereon updated flight-related information.

18. A non-transitory computer readable medium on an avionics device storing computer readable program instructions, the instructions causing the avionics device to implement a method for transferring flight-related information, the method comprising:

establishing a first wireless data link with a remote off-board provider;

receiving through the established first wireless data link data from the off-board provider;

storing the data received from the off-board provider;

establishing a second wireless data link with an aircraft cockpit system;

transmitting through the established second wireless data link the stored data;

transmitting through the established second wireless data link commands entered by a user of the avionics device; and configuring the avionics device to be used as a control device while the second wireless data link is established, wherein the avionics device includes data entry components configured for actuation by a user so as to manipulate information presented on the aircraft cockpit system in a manner that synchronizes what is displayed on the aircraft cockpit system with what is displayed on the avionics device.

* * * * *